United States Patent [19]

Constantine

[11] Patent Number: 4,669,237

[45] Date of Patent: Jun. 2, 1987

[54] BATPROOFING APPARATUS AND METHOD

[76] Inventor: Denny G. Constantine, 1899 Olmo Way, Walnut Creek, Calif. 94598

[21] Appl. No.: 254,220

[22] Filed: Apr. 15, 1981

[51] Int. Cl.$^4$ .......................... E04B 1/72; E04H 9/16
[52] U.S. Cl. ................................................. 52/101
[58] Field of Search ............................. 52/101; 49/58; 43/65–67; 160/12–17

[56] References Cited

U.S. PATENT DOCUMENTS

| | | | |
|---|---|---|---|
| 658,254 | 9/1900 | Friedly | 49/58 X |
| 893,943 | 7/1908 | Sellman | 43/65 |
| 1,080,417 | 12/1913 | Clark | 52/101 |
| 1,472,210 | 10/1923 | Fall | 43/65 |
| 2,589,360 | 3/1952 | Ferguson | 43/65 |
| 3,108,294 | 10/1963 | Brown, Jr. | 43/65 X |

Primary Examiner—Philip C. Kannan
Attorney, Agent, or Firm—Robert Charles Hill

[57] ABSTRACT

An apparatus and method of use thereof is disclosed for ridding areas of bats. The apparatus comprises an exit passageway that permits bats to move out of the area and down through an exit passageway. The passageway prevents return entrance to the area because of the passageway size construction. The size of the internal surface, the flexibility of a portion thereof and the material of its construction prevents the bat reentry.

2 Claims, 9 Drawing Figures

BATPROOFING APPARATUS AND METHOD

The present invention relates to a means and method for preventing reentry of flying animals, such as bats, from a roost by providing a passageway that permits exit but not entry.

BACKGROUND OF THE INVENTION

Bat colonization in buildings is often undesired in America because (1) one bat among hundreds or thousands may develop paralytic rabies, fall down, and bite people who handle it, (2) in the Southeastern United States and in tropical areas of the world, bat guano may contain infective spores of the fungus *Histoplasma capsulatum,* which if inhaled in sufficient quantity can produce histoplasmosis in man and animals, or (3) the bats are considered a nuisance. The fear of rabies is the greatest problem.

An estimated 75% of the rabies-infected bats found in California live in trees or other natural harborages. However, a significant quantity find shelter as colonies in buildings. Pest control operators and public health and animal control agencies used to destroy bat colonies in buildings using pesticides or other toxicants, an approach now known to be counterproductive. Killing the bats or repelling them chemically is a waste of time and other resources, because other bats soon colonize the open roost. Moreover, toxicants (and chemical repellents, often misapplied on the bats instead of the roost) scatter sick bats that bite inquisitive persons and pets, increasing manifoldly the numbers of antirabies treatments given people and the numbers of pets that must be destroyed or quarantined and a "treated" roost can produce downed bats for four years or longer.

It has long been known that the only permanent way to rid buildings of bat colonies is to stop up their exit holes after the bats leave to migrate elsewhere for the winter or after they fly out at night to feed on flying insects or in select situations by installing physical repellents such as lights or other disturbing factors. Exterminators claim the displaced bats which then move to a new or alternate roost take with them an impending rabies outbreak, despite abundant evidence that rabies outbreaks do not occur in insectivorous bats. It can be suspected that batproofing eliminates a renewable source of income for exterminators, who would be called to destroy successive groups of bats that move into unsealed roosts.

It is frequently difficult to find someone to do the batproofing work for many reasons including the necessity to work at night, frequently requiring ladder work at night, the mistaken fear of retaliatory attacks by either rabid or nonrabid bats, the fear of acquiring rabies infection through inhalation, and the fear of taking antirabies inoculations either after exposure or the abbreviated preexposure series.

BRIEF DESCRIPTION OF THE INVENTION

Most of the foregoing concerns are greatly decreased when the batproofing can be done in daytime. The night work could be avoided if a one-way outlet or valvelike device were installed during daytime in or over the only entryway-exit from a bat roost, permitting bats to exit after dark but preventing reentry. In accordance with the present invention, bats that leave through a tube, slot, or similar device placed in or over a roost exit pass downward through the tube, slot, or other device but can not propel themselves upward through the device.

The bat passageway herein proposed comprises a rigid or somewhat rigid, smooth-sided tube, slot, or other passage through which the bat(s) could slide or drop downward and out, but too smooth-sided to permit reentry by climbing upward through the device, too narrow to permit reentry by flying, and too wide to permit reentry by hunching upward through alternate bracing against the sides. Another embodiment of similar conformation and also smooth-sided comprises a soft, plasticlike passage that collapsed partially closed when bats tried to reenter and lacked firm walls against which to hunch upward. Both ends of any passageway are preferably at least partially open, enabling bats to identify the passage as an exit by draft, light, and sound passing through it. The device should be about twice the length of the bat's body to prevent the bat from reaching through with a folded wing or leg to grasp the roost interior as a means to reenter the roost.

OBJECT OF THE INVENTION

The object of the present invention is to provide a simple and effective means for eliminating bats from a roost by permitting the bats to exit and by preventing their reentry through the same, or another, exit.

A further object in accord with the preceding object is to establish a bat exit through a duct (tubular, slotlike, or other shape) member which is dimensioned to permit exit but not reentry of the bat.

A further object in accord with the preceding objects is to provide a bat exit constructed of such form and materials that will prevent the bat from reentry through the exit.

Further objects and features of the present invention will be readily apparent to those skilled in the art from the appended drawings and specification illustrated preferred embodiments wherein.

BRIEF DESCRIPTION OF THE PREFERRED EMBODIMENT

Figure 1:
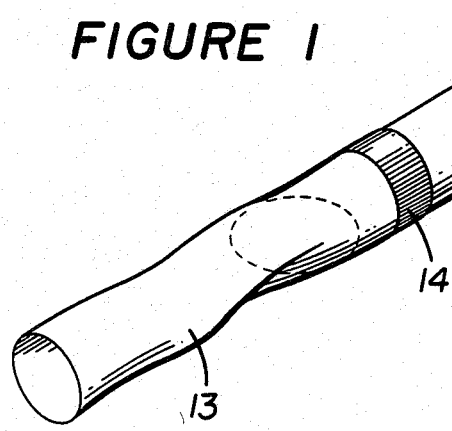
FIG. 1 is an assembled perspective view of the exit passageway of a tubular example of the present invention.
Figure 2:
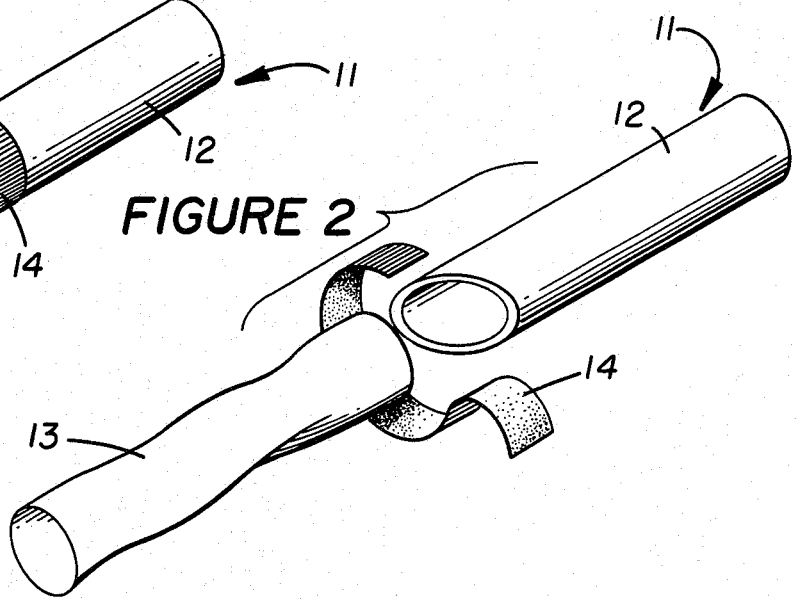
FIG. 2 is an exploded view of the elements of the passageway of FIG. 1.

The passageway generally indicated 11 of the present invention comprises, in its most widely adaptable form, a first tubular member 12 preferably of semirigid material and a second tubular member 13 of a more flexible material. As shown in FIG. 1, the tubular members 12 and 13 are assembled with member 12 inside member 13 and joined together by an adhesive tape 14 wrapped around the joint of the two members. As shown in FIG. 2, the two members 12 and 13 have cylindrical diameter dimensions substantially the same. The flexibility of member 13 permits the insertion of member 12. The overlap of the two members when joined is not critical, but must be enough to establish a good connection between the two. The joint tape 14 covers a sufficient portion of the two members to establish a firm contact therewith and to assure structural stability in the assembled passageway.

The flexible tubular member 13 is flexible enough to admit member 12 and to permit the member 13 to not maintain a tubular cross-section. That is, the member 13 may partially collapse upon itself but may be spread outwardly into a tubular or other configuration.

Both members 12 and 13 are preferably formed of a material that has a substantially smooth inside surface.

FIGS. 3, 4, 5 and 6 illustrate several possible installations of the passageway 11 in use as an exit passageway for bats or the like.

Figure 3:
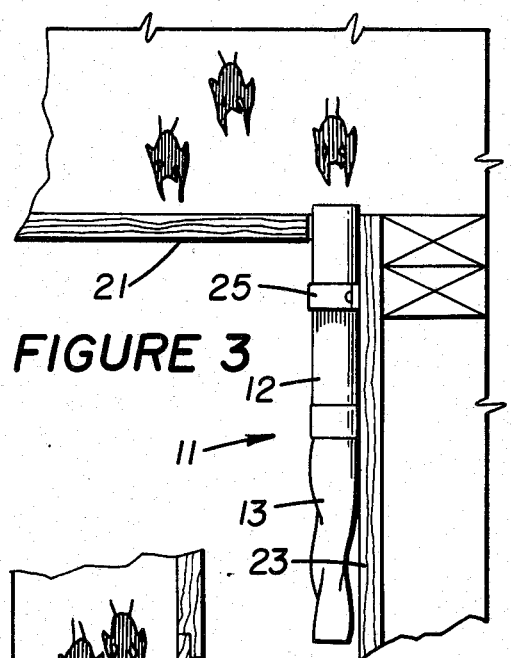
FIGS. 3, 4, 5 and 6 are elevational views of the possible installation of the passageway of a tubular example of the present invention.

FIG. 3 illustrates the passageway mounted below a horizontal surface and along a vertical wall. As illustrated, the installation might be along the exterior wall of a building with one end of the passageway 21 extending through the exterior trim board 21 with the body of the passageway 11 fixed to the exterior siding 23 by a U-shaped clamp 25 nailed, or otherwise secured, to the siding 23.

Figure 4:
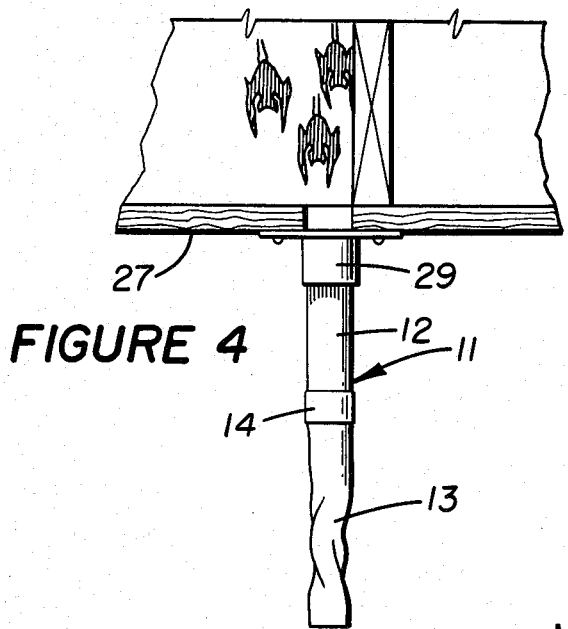

FIG. 4 illustrates the passageway 11 mounted below a horizontal surface of a building with the rigid tubular member 12 flush with or extending slightly into the interior of the dwelling. The passageway 11 is fastened to the undersurface of the trim 27 by a suitable fixture 29 or by adhesive tape, such as duct tape. Other clamping fixtures may be used to attach the passageway 11, the only essential feature is that the passageway 11 be completely sealed against the hole through the exterior surface.

Figure 5:
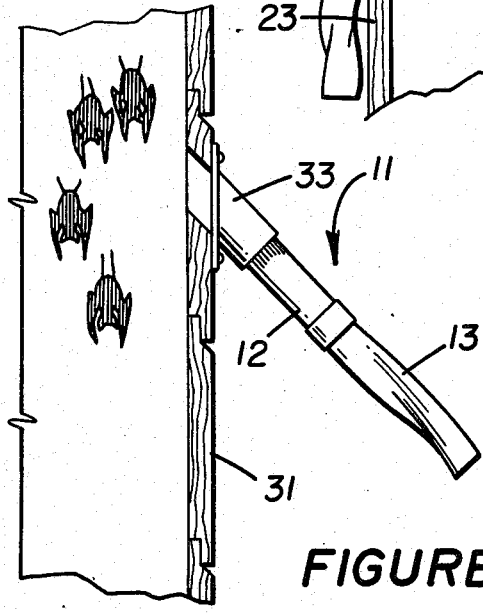

FIG. 5 illustrates the passageway 11 mounted to extend at an angle away from the exterior wall of a building. In this installation, the passageway is fixed to the siding 31 by a fixture 33; however adhesive tape, such as duct tape, may be used.

Figure 6:
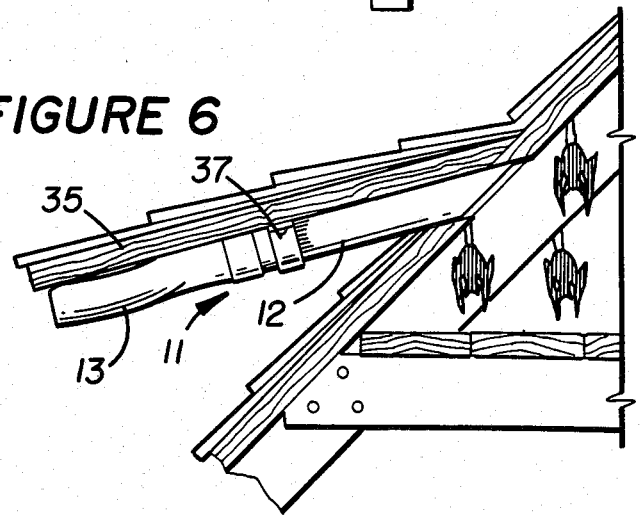

FIG. 6 illustrates the passageway 11 mounted to a vent along a surface, such as a portion of a roof, of a building. In this installation, the passageway 11 is mounted to the undersurface of a vent cover 35 by a strap 37 around the rigid tube 12. A portion of the tube 12 extends into the interior of the building.

In each of the installations illustrated in FIGS. 2, 3, 4, 5 and 6, the rigid member is mounted within or on the building with the end of the tube 12 matching as closely as possible the angle of the building exterior. To accommodate that mounting, the rigid member has one end cut at right angles to the axis of the tube and the other end preferably cut at approximately 45°, as illustrated in FIGS. 1 and 2. The assembled passageway is arranged with either the squared end or the angled end to permit the best sealing arrangement with the building exterior.

In each of the illustrated mountings of the passageway, the flexible tubular member 13 is mounted hanging down from the mounted rigid member 12 and illustrated as partially collapsed.

Also shown in FIGS. 3, 4, 5 and 6 are possible positions of resting bats. The interior of the passageway 11 must be in a place where the bats can recognize it as an exit and can move to a position to exit through the passageway.

It should be understood that the foregoing valvelike passageway and installation techniques could be substituted for or embellished by the installation of overlapping or unidirectional bristles or prongs or by doors such as a spring, elastic, or gravity-closing swing door, flap, trap-door, or even a revolving door. But these could be unnecessary in many instance and some might provide nail-holds for bats to grasp, possibly clogging the passageway or permitting reentry. In addition, they might interfere with passage of air, light and sound.

Several laboratory studies and field applications of the passageway of the present invention have been done. Bats were remarkably adept at advancing upward through smooth-sided tubes, a problem that was avoided when the passageway as herein shown was either composed of or included at its terminus the flexible tubular member 13 which collapsed closed when bats tried to reenter.

Figure 7:
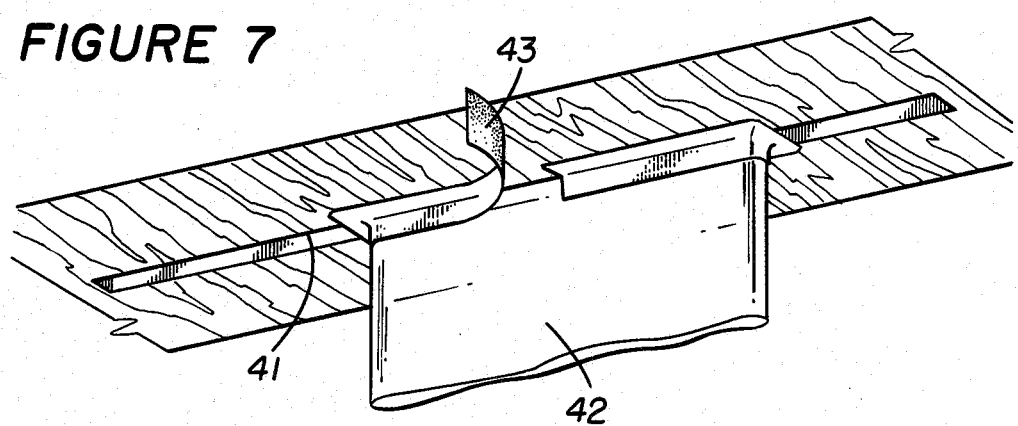
FIGS. 7, 8 and 9 are perspective views illustrating an alternative form of a one way exit system employing a slotlike configuration.
Figure 8:
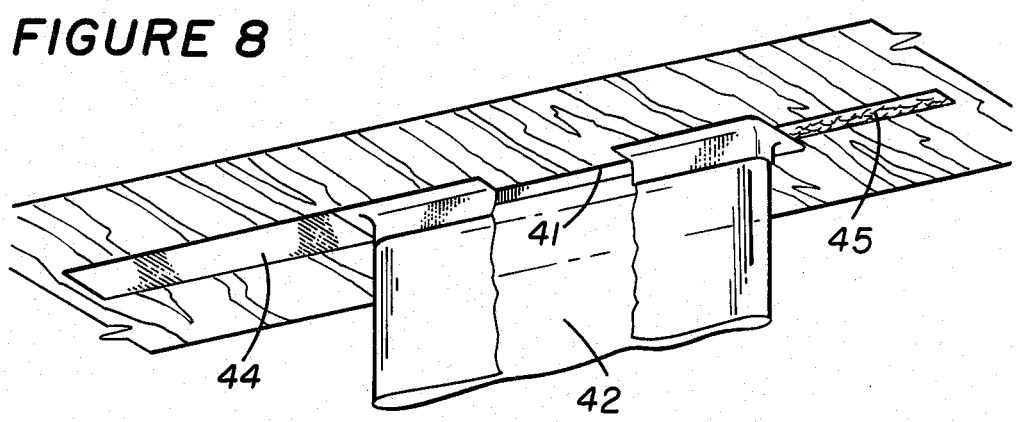
Figure 9:
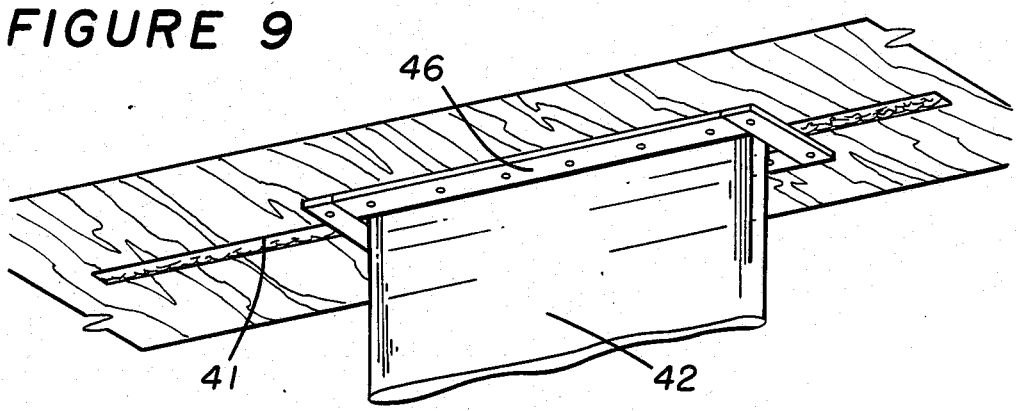

FIGS. 7, 8 and 9 illustrate an alternative form of one way exit system employing a slotlike configuration. In some bat roosts the colony has access to the roost through an overhead slot, as represented at 41 in FIG. 7. The alternate exit system employs an elongated pliable duct 42 secured under the overhead slot 41 by adhesive tape 43 or by another suitable fixture that may be secured to the overhead surface around the slot. The pliable duct 42 is flexible and generally collapsed on itself to permit exit through the duct but prohibits reentry because the animal or bat cannot make an opening.

FIG. 8 illustrates the pliable duct 42 with a portion broken away to illustrate the overhead slot 41 within the duct. Also illustrated are alternate means for sealing the remainder of the slot 41 using adhesive tape 44, packed rags or other stuffing as at 45 or patching plaster.

FIG. 9 illustrates an alternate form of securing the pliable duct 42 to the surface around the overhead slot 41. In this form wooden or other solid strips 46 are placed around folded-over edges of the duct to secure the duct to the overhead surface.

LABORATORY STUDIES AND FIELD APPLICATIONS

Several laboratory studies and field applications illustrated how various passageway dimensions, orientation, or other factors did or did not serve to prevent reentry after a bat had passed through an intended valve.

Thirty newly-captured bats (10 each pallid bats, *Antrozous pallidus;* big brown bats, *Eptesicus fuscus;* and Brazilian free-tailed bats, *Tadarida brasiliensis*) were tested to determine their abilities to advance upward through clear, rigid, smooth-surfaced plastic tubes of differing diameters and positioned at various angles from horizontal. The tubes had inside diameters in cm of 3.1, 3.8, 4.9 and 7.4. In each instance an individual bat was introduced into the end of a tube, whereupon the bat would start crawling deeper into the tube. The opposite end of the tube was then slowly raised until the bat would slip on the smooth surface and remain stationary instead of advancing. Pallid bats and big brown bats could ascend vertically through smaller tubes but were stopped in the 7.4 cm tube, between 61° and 66°. Although free-tailed bats could ascend vertically through the smallest tube, they were stopped at 53°, 31° and 36° in the successively larger tubes. Bats would brace themselves to avoid slipping back by flexing the spine, pushing elbows outward, or slightly opening the wings, positions that applied force to tube sides. The animals could increase the angle of advance by stubbornly stroking with feet and folded wings, depositing body oils or refuse on the plastic surface, which offered traction upon drying. Considerable intraspecific variation in success was evident. It appeared that free-tailed bats could not ascend vertical or tilted 4.9 cm or 7.4 cm tubes, but auxiliary or different methods would be required to prevent reentry of other species. It was evident that simple rigid or semirigid tubes of reasonable dimensions were not universally suitable to exclude bats, leading to the use of a sometimes less simple technique of a pliable elongated duct of flexible material that collapses upon itself to produce the desired oneway exit duct.

One open end of either collapsible tube or collapsible slot was fixed open at its entrance (upper end) by attachment to all edges of the opening, but it hung free at its exit (lower end), which would collapse closed when bats tried to reenter. Having passed through the collapsible tube or collapsible slot guard, bats could not return by flying through the small or narrow passage, the smooth surface prevented the animals from engaging their nails to crawl through, and the pliable material was unsuitable to permit upward progression through alternate bracing against sides of the passage.

Used for these purposes, the collapsible tubes were usually 5 cm in diameter but sometimes 15 or more cm in diameter, and their length was usually no more than 15 or 20 cm but sometimes longer. In cross-section, collapsible slot guards were usually 2.5 to 5 cm high and 15 cm to one or several meters wide, and they were usually 15 to 30 cm long.

The foregoing experiences demonstrated the essential features of the present invention. The features of the invention are a short, pliable, plastic tube or laterally compressed sleevelike passage, made of material resilient enough to remain open, permitting passage of air, sound, and light to entice bats to leave through it, but pliable enough to collapse closed under the weight or force of a bat trying to reenter from outside the building. The collapsible tube or the collapsible slot guard could be fastened over some bat roost departure holes using duct tape or other materials. In some cases, the soft plastic and small diameter of the collapsible tube would make it difficult to attach the exit system to some surfaces or sites, so it became desirable to attach to the collapsible tube or slot guard a firmer base tube to facilitate mounting to the roost entrances. Bats could slide downward through the fixed base tube, thence continue sliding through the collapsible tube, which would act as a one-way valve. The base portion and exit portion could be of similar dimensions, the softer portion overlapping the firmer portion, to which it could be connected. This combination tube would ideally be directed downward from the bat roost exit 45° or preferably 90°.

Some bats depart through holes in walls, others leave through ceiling-like surfaces, and other variations exist. FIGS. 1-6 illustrate the tubular form of the exit valve adapted to permit attachment to almost any surface. One end of the base tube was beveled at 45° for mounting at that angle on walls, and the other end was squared off for ceiling hole adaptation or other vertical orientation.

To accommodate application to all species of bats in the United States of America and in Canada, and to most varieties of roosts in buildings, the following example specifications were used as guidelines. The base tube 12, of necessity somewhat rigid and difficult to deform except for slight lateral compressibility to enabling inserting an end into a slot if desired, would be made of 800 u (1/32 in.) thick, 4.9 cm butyrate tubing, 20 cm long, squared at one end and cut at 45° at the other end.

The collapsible tube 13, necessarily incompletely resilient, easily temporarily deformed and collapsed shut by force, would be 100 u (0.004 in. or 4 Mil) thick polyethelene tubing of dimensions similar to those of the base tube except squared at both ends. By overlapping about 2.5 cm one end of the collapsible tube over either end of the base tube and fastening them together (e.g., with tape), one has a combination passageway 11, adaptable to most field situations. The base tube 12, alone or in combination, could be secured in position to concrete and some other surfaces with duct tape, or it could be fastened to wood using one or more metal straps, inserting a length of double-faced tape between the strap and the tube and fastening the strap to wood with screws through strap perforations.

The collapsible principle (applied as a collapsible tube, combination passageway, collapsible slot guard, or other version) is superior and should be used consistently, even though free-tailed bats were blocked by rigid, vertical or slanted, smooth-surfaced base tubes alone. The barrier effect of a rigid upright smooth surface may be overcome as determined bats, seeking departed offspring or mothers, repeatedly try to ascend the smooth surface, improving traction as they slowly lay down a gummy deposit. Moreover, more than one species of bat may occupy a roost, including a species that can negotiate a steep angle and reenter. The combination passageway has greatest versatility.

Where bats leave a building via any point along an elongated slot, the slot may be either temporarily or permanently sealed shut except at one or more points where combination tubes are installed. An alternate solution as shown in FIGS. 7-9, feasible where suitable attachment surfaces border the slot, is to install a collapsible slot guard over a portion or all of the slot, attaching it with duct tape or other appliances or materials, and either temporarily or permanently sealing any otherwise uncovered portions of the slot.

A method of batproofing a building using the passageway of the present invention is accomplished by first discovering all available entries for the bats to the building and by sealing all but a few of these entries with materials such as patching plaster. Then the passageways (combination tube(s) and/or collapsible slot guard(s) are mounted to the few remaining exits allowing ventilation and light to pass into the bat roost through the passageway. The bats are then permitted to exit through the one-way passageway; their departure can usually be determined by the absence of bat squeaks and the absence of bat feces near the passageway.

After a reasonable period of time, for instance 24 to 48 hours, the passageways can then be removed and the remaining holes plugged with rags until complete sealing of the building can be accomplished.

A number of precautions are in order when the batproofing is done. The flying members of a bat colony should not be excluded from a bat roost while the roost contains young, flightless bats. The young bats, being deprived of milk, would crawl about in desperation, some falling outside and some possibly getting into rooms below. Bites could result, precipitating complications due to fear of rabies. Even if none of the young bats escape, odors from their decaying bodies would be undesirable. Thus one should not do batproofing during the interval from birth to flight capability. North American housebats have a single annual litter composed of one or two members, depending on the species or subspecies. Birth and flight capability occur earlier in warm geographic areas compared to cooler areas, and there are species differences as well. Bat exclusion should be avoided from May 1 through August 31, a practical schedule that considers the foregoing variations.

Serious consequences can follow if bats are sealed inside a roost. This can happen accidently if young bats, yet incapable of flight, are present or if the roost contains lethargic or hibernating bats, chilled by cold weather. Some persons have deliberately sealed bats inside roosts. The bats crawl about trying to get out, often entering building living spaces, by which time they may be too weak to fly, and people or pets have been bitten as the bats are either handled, inadvertently sat upon, rolled upon in bed, or otherwise contacted.

There is a possibility that bats may be unknowingly sealed inside a house. Bats usually do considerable squeaking during warm weather, so homeowners are aware of their presence at such times. However, if the weather grows cold when the bats are present and the animals become chilled, they become lethargic and enter a physiologic state resembling hibernation, or they may actually hibernate for prolonged cold periods. Most Northern housebats migrate to caves or other natural shelters to hibernate for the winter, although one or a few will hibernate in some northern buildings. Other bats migrate to warmer climates, enter roosts such as buildings, and remain active during winter unless cold periods intervene, making them and their insect food lethargic or dormant. Bats make little or no noise during cold weather, when they are often in deep protective crevices. Thus, house owners may not always know that the animals are present at such times. One can avoid sealing the animals inside by sealing all known and potential entries except for one or more obviously used sites in which valves should be installed and left until after the return of warm weather, when the valves can be removed and the sites permanently sealed. Therefore, one should adhere to the following calendar guidelines:

Winter: This is the best time to batproof a building if it is known with certainty that the bats are absent, whereupon all known and potential entry holes should be sealed. If some bats are suspected or known to hibernate in the building, sealing should be supplemented by the installation of one or more passageways of the present invention to assure that all bats can leave after the weather warms in spring, after which the passageways should be removed and the sites sealed.

Early Spring: Batproofing can proceed from the time the weather warms until just before the newborn bats are produced (bats are born as early as about May 1 in most areas). Seal all known and potential entries except for the installation of one or more passageways, which can be removed and the final holes sealed after all bats have left.

May 1 through August 31: No batproofing should be attempted during this interval, when young, nonflying bats may be present. The bats should be left undisturbed.

September 1 until Winter: Proceed as during early spring.

There can be a danger that bats will be injured or killed by exceptionally high temperatures that are created in bat roosts when roost ventilation is retarded by roost sealing and passageway installation done on very hot days. Solutions include use of porous blocking materials, such as wire mesh, or by delaying sealing until just before dark.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:
1. An attachment to a building for assisting in eliminating bats from said building comprising,
   (a) a flexible slotlike member attached to the surface of said building where the presence of said bats is expected and extending generally straight downwardly therefrom,
   (b) means sealing the exterior of said slotlike member to said building while permitting light, ventilation and bat passage through said slotlike member,
   (c) said slotlike member being so constructed and arranged along its internal surface so as to permit said bats to exit from said building through said member but presenting a smooth surface so as to prevent return passage of said bats through said member into said building.
2. The attachment of claim 1 wherein said slotlike member has a rectangular cross-section with a width in one dimension of 2.5 centimeters to 20 centimeters and a width in the other dimension of 5 centimeters to 30 centimeters.

* * * * *